(12) United States Patent  
Woytowitz

(10) Patent No.: US 8,838,021 B2
(45) Date of Patent: Sep. 16, 2014

(54) DATA RELAY FOR A CONTROLLER

(71) Applicant: Hunter Industries, Inc., San Marcos, CA (US)

(72) Inventor: Peter J. Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 13/942,000

(22) Filed: Jul. 15, 2013

(65) Prior Publication Data

US 2013/0303082 A1 Nov. 14, 2013

Related U.S. Application Data

(63) Continuation of application No. 13/597,016, filed on Aug. 28, 2012, now Pat. No. 8,509,683, which is a continuation of application No. 12/621,330, filed on Nov. 18, 2009, now Pat. No. 8,275,309.

(51) Int. Cl.
*H04B 7/14* (2006.01)
*H04B 7/15* (2006.01)
*H04L 25/02* (2006.01)

(52) U.S. Cl.
CPC .............. *H04B 7/15* (2013.01); *H04L 25/0282* (2013.01)
USPC .................. 455/14; 455/7; 455/11.1; 455/15; 455/21; 455/23; 700/284; 700/275; 370/277; 370/279; 370/282; 370/315; 370/327

(58) Field of Classification Search
CPC .............................. H04B 7/15; H94L 25/0282
USPC ............ 455/7, 11.1, 15, 20, 21, 23, 423–425, 455/67.11, 550.1, 422.1, 403, 575.1, 500, 455/517, 507, 508; 700/284, 275; 370/277, 370/279, 282, 315, 326, 327
See application file for complete search history.

(56) References Cited

U.S. PATENT DOCUMENTS

| | | | |
|---|---|---|---|
| 7,805,221 B2 | 9/2010 | Nickerson | |
| 8,275,309 B2 | 9/2012 | Woytowitz | |
| 2010/0145530 A1 | 6/2010 | Nickerson et al. | |
| 2010/0312404 A1 | 12/2010 | Nickerson | |
| 2011/0137472 A1 | 6/2011 | Hitt et al. | |
| 2011/0238227 A1 | 9/2011 | Hern et al. | |
| 2011/0238230 A1* | 9/2011 | Runge et al. | 700/284 |
| 2011/0270449 A1 | 11/2011 | Nickerson et al. | |
| 2013/0040559 A1 | 2/2013 | Woytowitz | |

* cited by examiner

*Primary Examiner* — Keith Ferguson
(74) *Attorney, Agent, or Firm* — Knobbe, Martens, Olson & Bear, LLP

(57) ABSTRACT

A two conductor hard wired communications link accepts an actual value of at least one parameter of interest from an environmental sensor in the form of data encoded on the conductors via current modulation. The sensor is mounted in a location remote from an irrigation controller. A circuit connected to the sensor transmits an RF signal representing an actual value of a parameter of interest detected by the sensor. A data relay is connected to the hard wired communication link of the irrigation controller. The data relay includes a receiver that receives the RF signal, and circuitry configured to extract the actual value of the parameter of interest and emulate a predetermined set of physical and protocol properties of the hard wired communication link of the irrigation controller.

20 Claims, 5 Drawing Sheets

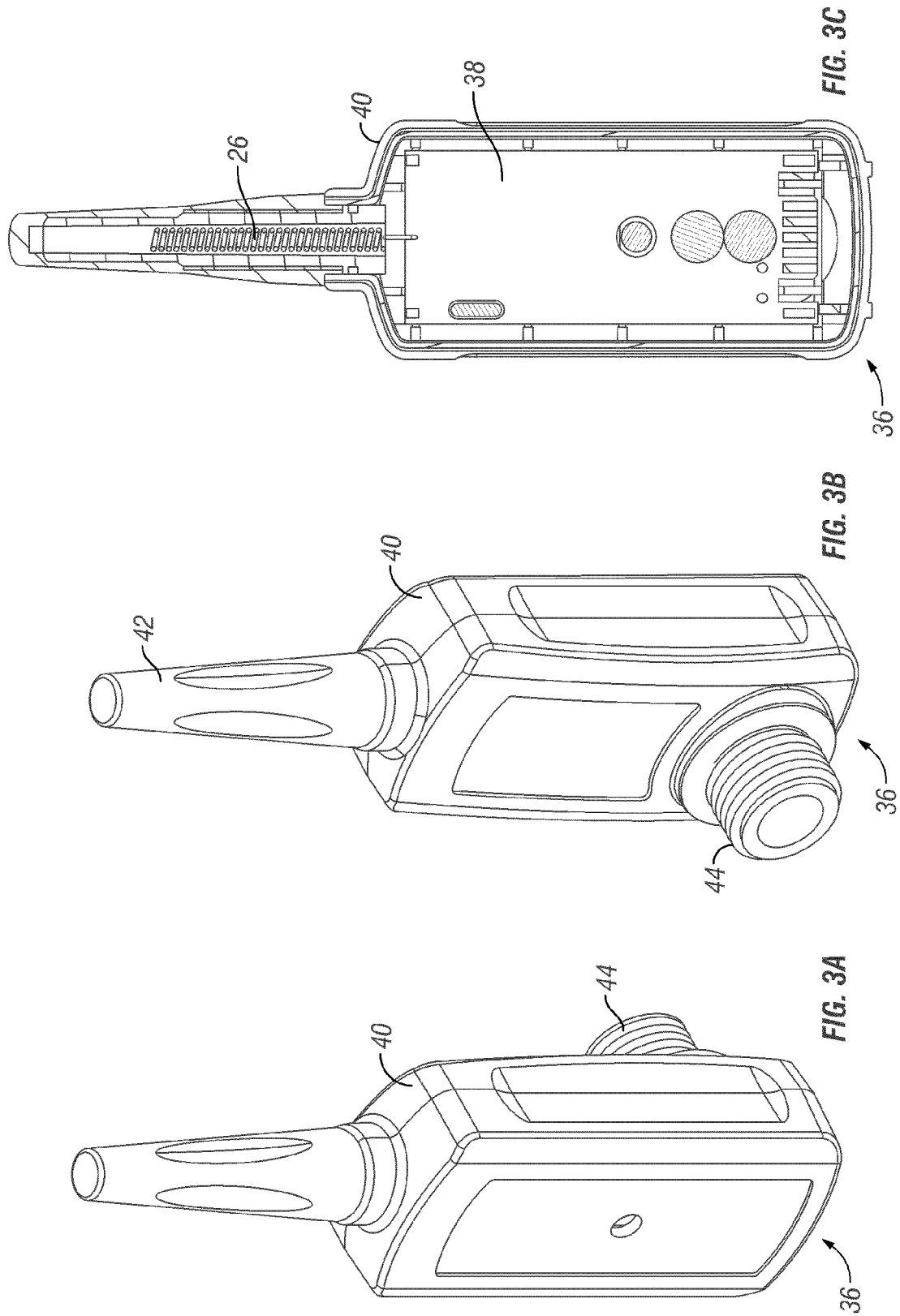

DATA RELAY FOR A CONTROLLER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Field of the Invention

The present invention relates to data communication, and more particularly, to wireless data communication devices.

2. Description of the Related Art

An irrigation controller sometimes uses signals from remote environmental sensors that detect rain events, temperature, solar radiation, wind speed, humidity, soil moisture, evapotranspiration, flow, or other parameters. Typically the irrigation controller and the sensor communicate through a hard wired connection. Many times the hard wired connection uses the same pair of wires to supply power to the sensor, as it does to communicate information back to the irrigation controller. Other times separate wires are used for power and control. One of the reasons the communications link is typically a hard wired connection is the fact that many times the irrigation controller is installed in a vandal-resistant metal cabinet that shields RF signals, making it impractical to use a wireless communications link. Another reason that the communications link is typically a hard wired connection is that an RF receiver circuit typically costs significantly more than a simple hard wired receiver circuit.

As previously mentioned, irrigation controllers conventionally retrieve data from a remote sensor using a two conductor hard wired connection. Typically a pair of wires carries both an excitation voltage to power the sensor as well as data in the form of a modulated current draw. Data containing environmental information of interest is communicated to the irrigation controller by modulating the amount of current drawn by the environmental sensor that is sending the data. Current modulation is typically more noise tolerant and affected less by long wire runs, than a voltage modulated signal.

SUMMARY OF THE INVENTION

In accordance with one aspect of the present invention a data relay includes an RF receiver, a demodulator, a microcontroller and a current modulator. The RF receiver is configured to receive an RF signal transmitted from a remote location representing data from a sensor. The demodulator retrieves a base band data signal from the received RF signal. The microcontroller receives the base band data signal and determines an actual value of at least one parameter of interest. The current modulator is controlled by the microcontroller and transmits the actual value of the parameter of interest to a controller on a pair of conductors by emulating a predetermined set of physical and protocol properties of a predetermined two conductor hard wired communication link of the controller.

In accordance with another aspect of the present invention an irrigation system includes an irrigation controller, at least one environmental sensor and a vandal resistant data relay. The irrigation controller includes a two conductor hard wired communications link for accepting an actual value of at least one parameter of interest from an environmental sensor in the form of data encoded on the conductors via current modulation. The environmental sensor is mounted in a location remote from the irrigation controller. A circuit is connected to the environmental sensor for transmitting an RF signal representing an actual value of a parameter of interest detected by the environmental sensor. The vandal resistant data relay is connected to the two conductor hard wired communication link of the irrigation controller. The vandal resistant data relay includes a receiver that receives the RF signal, and circuitry configured to extract the actual value of the parameter of interest and emulate a predetermined set of physical and protocol properties of the two conductor hard wired communication link of the irrigation controller.

BRIEF DESCRIPTION OF THE DRAWINGS

FIGS. 3A, 3B and 3C are front isometric, rear isometric and vertical sectional views, respectively, of a data relay module in accordance with the present invention.

DETAILED DESCRIPTION

Figure 1:
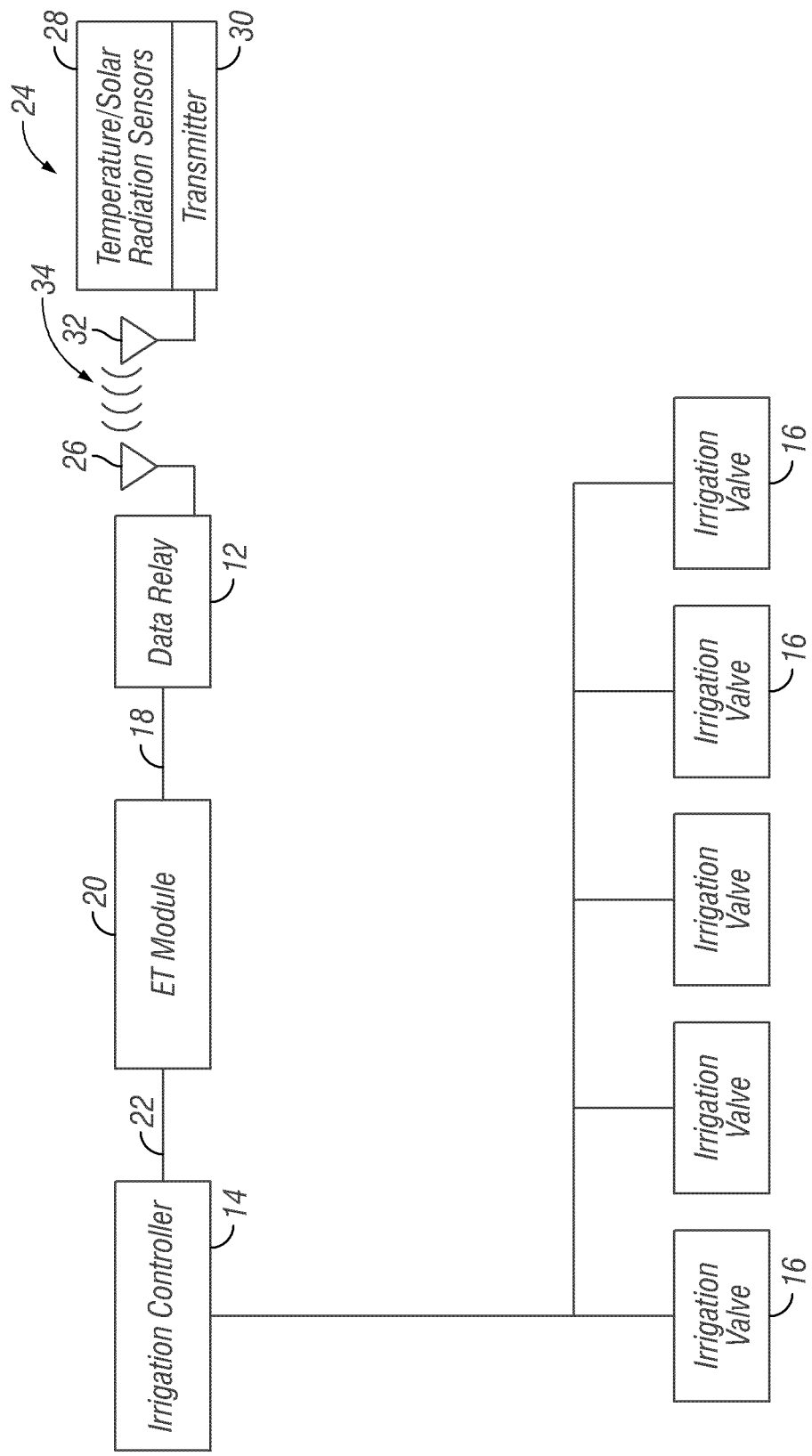
FIG. 1 is a block diagram of an irrigation system incorporating an embodiment of the data relay of the present invention.

The entire disclosures of the following U.S. patents and U.S. patent applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH-DENSITY STATION MODULE; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; U.S. patent application Ser. No. 10/883,283 filed Jun. 30, 2004 also of Peter J. Woytowitz entitled HYBRID MODULAR/DECODER IRRIGATION CONTROLLER, now U.S. Pat. No. 7,069,115 granted Jun. 27, 2007; pending U.S. patent application Ser. No. 10/985,425 filed Nov. 9, 2004 also of Peter J. Woytowitz et al. and entitled EVAPOTRANSPIRATION UNIT CONNECTABLE TO IRRIGATION CONTROLLER; pending U.S. patent application Ser. No. 11/288,831 filed Nov. 29, 2005 of LaMonte D. Porter et al. and entitled EVAPOTRANSPIRATION UNIT FOR RE-PROGRAMMING AN IRRIGATION CONTROLLER; U.S. patent application Ser. No. 11/045,527 filed Jan. 28, 2005 also of Peter J. Woytowitz entitled DISTRIBUTED ARCHITEC- TURE IRRIGATION CONTROLLER, now U.S. Pat. No. 7,245,991 granted Jul. 17, 2007; U.S. Pat. No. 7,289,886 of Peter J. Woytowitz granted Oct. 30, 2007 entitled MODULAR IRRIGATION CONTROLLER WITH SEPARATE FIELD VALVE LINE WIRING TERMINALS; U.S. Pat. No. 7,225,058 of LaMonte D. Porter granted May 29, 2007 entitled MODULAR IRRIGATION CONTROLLER WITH INDIRECTLY POWERED STATION MODULES; U.S. patent application Ser. No. 11/458,551 filed Jul. 19, 2006 of LaMonte D. Porter et al. entitled IRRIGATION CONTROLLER WITH INTERCHANGEABLE CONTROL PANEL; and pending U.S. patent application Ser. No. 12/042,301 filed Mar. 4, 2008 of Peter J. Woytowitz et al. entitled IRRIGATION CONTROLLER WITH SELECTABLE WATERING RESTRICTIONS. The aforementioned U.S. patents and applications are all assigned to Hunter Industries, Inc., the assignee of the subject application.

The present invention provides a vandal resistant data relay which adapts a hard wired data interface into a wireless infrastructure. While the embodiment described herein functions with an irrigation controller as part of an evapotranspiration (ET) based irrigation system, the data relay could be used in other applications such as lighting controllers and industrial automation. The described embodiment functions with an irrigation controller that receives data encoded by modulating current on a two wire hard wired connection. However, the present invention can be adapted for use with other physical layers (wiring configurations and signal characteristics). In each of these applications, signals are brought into a controlling device, such as an irrigation controller, where these signals represent some useful piece of information which the controlling device uses to optimally achieve its function. In the case of an ET based irrigation controller, the information can represent, rain events, temperature, solar radiation, wind speed, humidity, soil moisture, evapotranspiration, flow, or other parameters. In the case of a lighting controller, the information could represent ambient light, temperature, detected motion or other parameters.

The data relay of the present invention adapts a control system designed for hard wired data gathering into a wireless system, while maintaining vandal resistance. This allows the control system to be manufactured in its reduced cost version, without burdening every unit produced with the additional cost associated with the wireless communications capability. The data relay of the present invention contains an RF receiver or transceiver, that gathers data from a wireless sensor (or other data retrieval device) that contains a transmitter (or transceiver), and then emulates the physical and protocol layers of the analogous hardwired sensor, to the controller. This data relay functionality is transparent to the controller, i.e. the controller does not "know" that the actual sensor is wirelessly connected. This feature is advantageous in keeping the design of the controller free from hardware, protocol, and software variations.

FIG. 1 is a block diagram of an irrigation system 10 incorporating an embodiment 12 of the data relay of the present invention. An irrigation controller 14 turns a plurality of irrigation valves 16 ON and OFF in accordance with a watering program. The data relay 12 is connected by a hard wired connection 18 to an ET module 20 which is in turn connected by a hard wired connection 22 to the irrigation controller 14. The data relay 12 receives RF signals from a weather station 24 via antenna 26. The weather station 24 includes a plurality of environmental sensors 28 such as a temperature sensor and a solar radiation sensor. The weather station 28 includes processing circuitry for encoding the signals from the sensors and sending them wirelessly to the data relay 12 via transmitter 30 and antenna 32. Thus the irrigation system 10 has a wireless communications link represented diagrammatically by parallel EM propagation waves 34.

The irrigation controller 14 may be the Pro-C® manufactured by Hunter Industries, Inc. The ET module 20 and the weather station 28 may be the Solar Sync® units manufactured by Hunter Industries, Inc. See pending U.S. patent application Ser. No. 12/181,894 filed Jul. 29, 2008 of Peter J. Woytowitz et al. entitled IRRIGATION SYSTEM WITH ET BASED SEASONAL WATERING ADJUSTEMENT, the entire disclosure of which is hereby incorporated by reference.

Figure 2A:
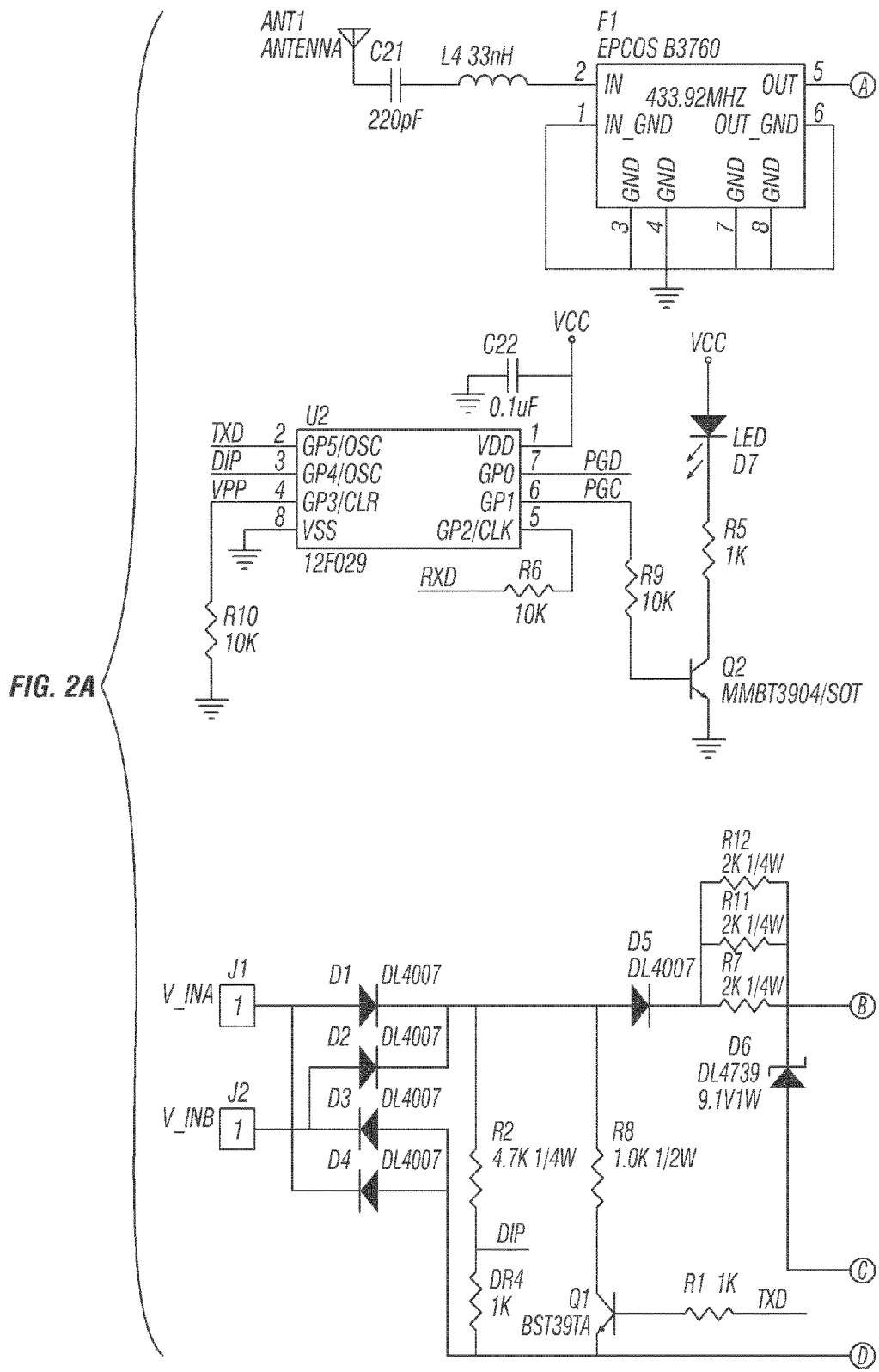
FIGS. 2A and 2B are a schematic diagram of the circuitry of the data relay that forms part of the system FIG. 1. The leads that terminate in the circled letters A, B, C and D in FIG. 2A connect to similarly labeled leads in FIG. 2B.
Figure 2B:
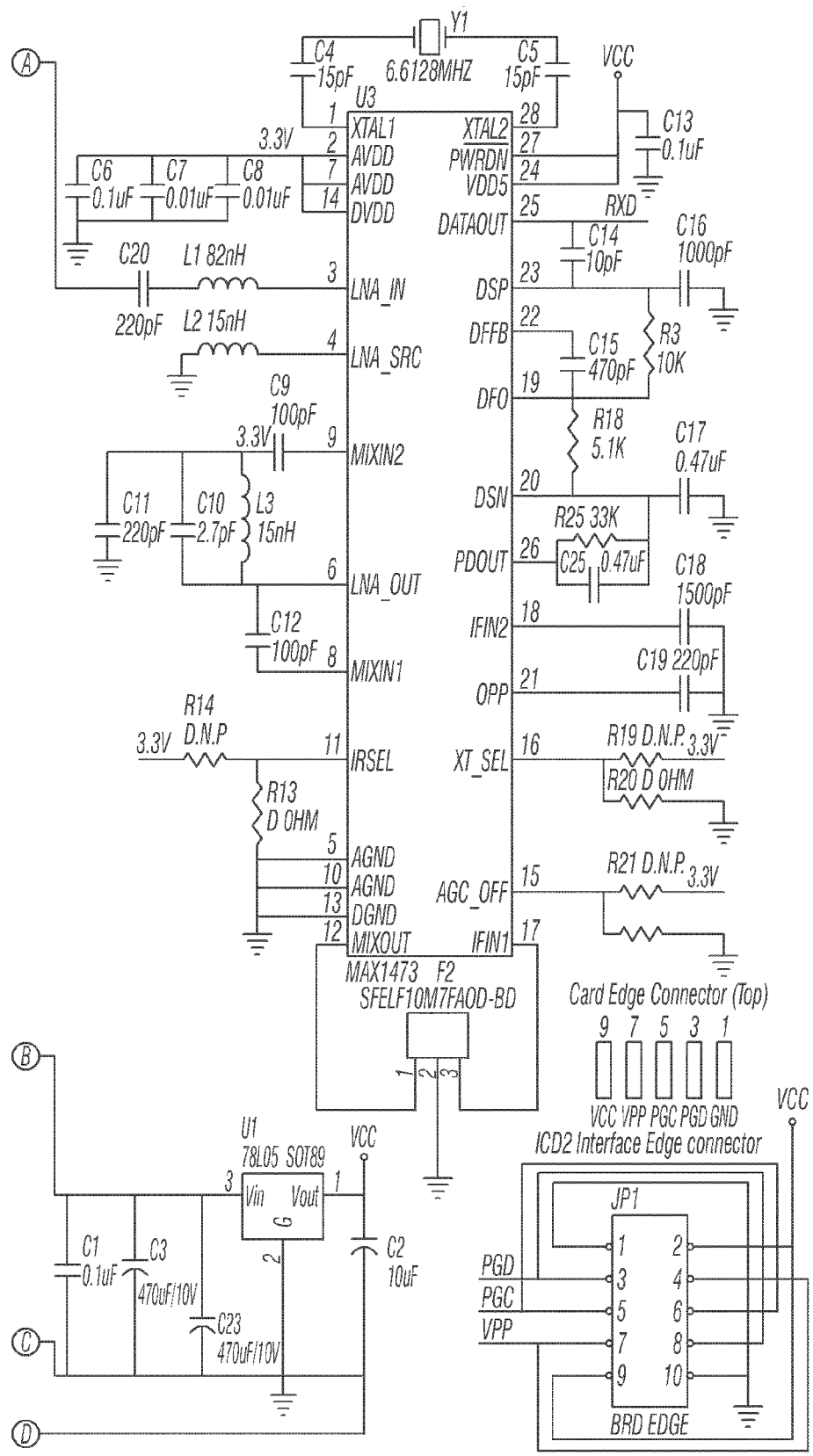
Figure 4:
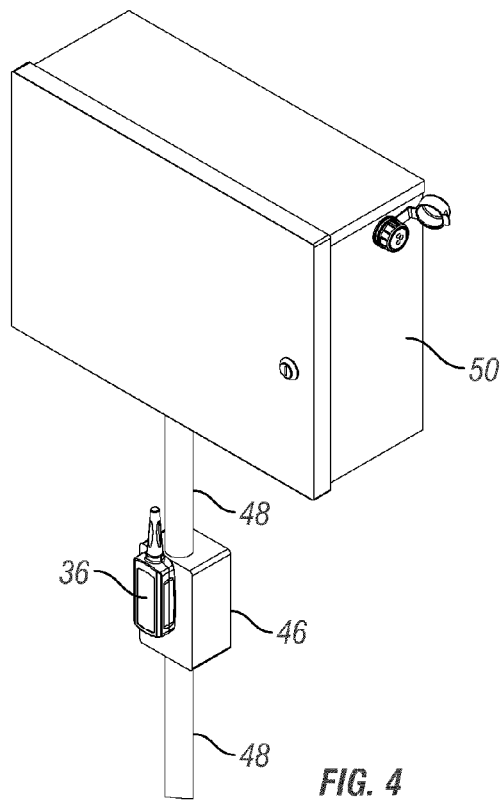
FIG. 4 is an isometric view of the data relay module of FIGS. 3A, 3B and 3C attached to a junction box connected to electrical conduit.

FIGS. 2A and 2B are a schematic diagram of the circuitry of the data relay 12. Incoming RF is first coupled to the receiving antenna 26, and then routed to a surface acoustic wave (SAW) filter, F1, which rejects any strong out-of-band signals that would otherwise "blind" an RF receiver. The SAW filter may be a type B3760 manufactured by Epcos. This particular model is designed to pass signals in the 434 MHZ band. After the filter, the RF signal is presented to RF receiver IC, U3, after passing through matching components which assure the maximum possible energy is transferred to the IC. The receiver itself may be a type MAX1473 available from Maxim Integrated Products. This receiver IC is highly integrated and provides low noise amplifier (LNA), phased locked loop (PLL), local oscillator (LO), and mixer circuitry internal to the part. Specifically, a reference crystal, Y1, of 6.6128 MHZ is fed into a phase locked loop in order to create a local oscillator frequency of 423.22 MHZ. This LO signal is mixed with an amplified version of the incoming RF signal to generate the intermediate frequency (IF) signal. This signal is amplified and brought out of the chip for filtering. The designer has their choice of IF filtering options. This design uses a 230 KHZ filter centered around 10.7 MHZ in order to filter the IF signal. This filter is a type SFTLA10M7FA00-B0 available from Murata. The filtered IF signal is then fed back into the receiver where the demodulation process retrieves the baseband data signal that was transmitted by the sensor and presents it to microcontroller U2. This may be a type PIC12F629 available from Microchip Technology. The microcontroller parses the RF data, determines the actual value of the parameter of interest, and then drives the current modulation circuitry which is comprised of bipolar Transistor Q1 and resistor R8, in a fashion that emulates the physical and protocol properties of the hard wired link. U1 is a simple linear voltage regulator such as a LM78L05, which takes the unregulated excitation voltage on the two wire path and generates a regulated 5 VDC signal to power the microcontroller and RF circuitry. Diodes D1-D4 form an incoming bridge rectifier which eliminates any polarity sensitivity of the incoming two conductor signal.

Figure 5:
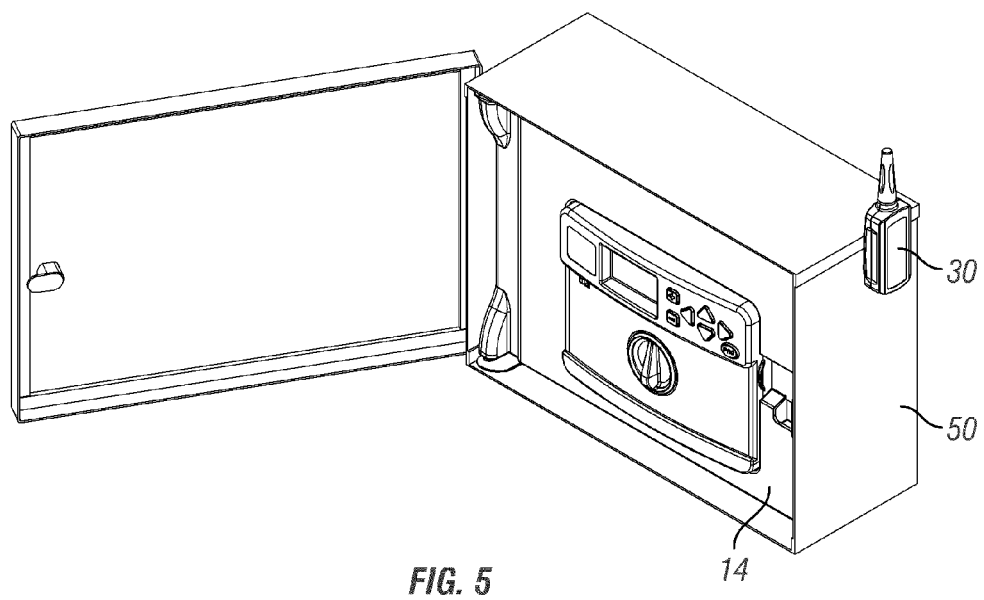
FIG. 5 is an isometric view of the data relay module of FIGS. 3A, 3B and 3C mounted on a metallic box that houses an irrigation controller.

An advantageous aspect of the illustrated embodiment 12 of the data relay of present invention pertains to its physical configuration in the form of a compact data relay module 36 (FIGS. 3A, 3B and 3C). Because of the level of integration available in modern IC's, the RF circuitry, microcontroller to supervise it, and power supply can all fit on a printed circuit board (PCB) 38 (FIG. 3C) measuring only one to two square inches in area. The PCB 38 is housed inside a compact rectangular outer housing 40 that supports the short antenna 26. The antenna 26 is embedded inside an outer protective jacket 42. The outer housing 40 includes a hollow cylindrical stub 44 (FIG. 3B) with a standard male pipe thread that allows it to be screwed into any standard pipe fitting with a female thread such as provided on an electrical junction box 46 connected to electrical conduit 48 leading to an electrical junction box 50 containing the irrigation controller 14. The cylindrical stub 44 may also be inserted through a standard knock-out through the side wall of the electrical junction box 50 as illustrated in FIG. 5. The electrical junction box 48 may be made of sheet metal, such as stainless steel sheet metal or it may be made of plastic. Wires (not illustrated) pass from the data relay circuitry of FIG. 2 to the irrigation controller 14 through the bore 48 of the stub 44.

The data relay module 36 emulates the physical and protocol layers of the hard wired communications link otherwise used to connect to the sensors 28. The physical configuration of the data relay module 36 has a number of practical advantages. For example, it provides the capability of mounting the data relay module 36 outside of a metal box, thereby providing a wireless solution into a metal enclosure, which would otherwise shield and prevent the entry any RF signal containing information from environmental sensors. This solution is different than simply providing relay circuitry inside the metal enclosure and connecting the same to an antenna mounted outside of the metal enclosure which may not be vandal resistant. The antenna would have to be connected to the RF receiver using special coaxial RF cabling which is both costly and difficult to splice. Furthermore, the more cable that is added, the greater the RF loss and lower the range for the system. The data relay module 36 provides an integrated and optimal RF solution which places the antenna 26 as close as possible to the receiver, while allowing the remote function to be accomplished with also any kind of cable.

The irrigation controller 14 may not be in an area conducive to wireless reception. For instance, the irrigation controller 14 may be mounted on wall inside a garage which has metallic siding on the outside that shields the RF signals. The irrigation controller 14 may be mounted in a basement which is subterranean and receives very little RF energy. In these situations, the data relay module 36 may be mounted in a location that allows for better reception such as on the outside wall of the garage, and hard wired to the irrigation controller 14.

While I have described an embodiment of a data relay that is particularly suited for use in an irrigation system, it will be apparent to those skilled in the art that my invention can be used in other applications. In addition, modifications and adaptations of my data relay will occur to such skilled persons. Therefore, the protection afforded my invention should only be limited in accordance with the scope of the following claims.

What is claimed is:

1. A system configured to include a data relay as part of a communication link between a controller and a sensor, the controller responsive to data supplied by said sensor, the system comprising:
   a controller including a hard wired communication link operating according to a protocol, the controller configured to accept data encoded on conductors of the hard wired communication link;
   at least one sensor mounted in a location remote from said controller and configured to detect a parameter;
   a transmitter electrically connected to the sensor and configured to transmit a radio frequency (RF) signal representing a value of the parameter detected by the sensor; and
   a data relay electrically connected to the hard wired communication link, and configured to receive the RF signal, to extract the value, and to encode the value on the conductors of the hard wired communication link according to the protocol.

2. The system of claim 1 wherein the data relay emulates physical and protocol properties of the hard-wired communication link.

3. The system of claim 1 wherein the controller comprises an irrigation controller.

4. The system of claim 3 wherein the irrigation controller comprises an evapotranspiration (ET) based irrigation controller.

5. The system of claim 4 wherein the at least one sensor comprises at least one of a temperature sensor and a solar radiation sensor.

6. The system of claim 5 wherein the parameter comprises at least one of rain events, temperature, solar radiation, wind speed, humidity, soil moisture, evapotranspiration, and flow.

7. The system of claim 3 wherein the controller is configured to turn ON and OFF a plurality of irrigation valves according to a watering schedule.

8. The system of claim 1 wherein the controller comprises a lighting controller.

9. The data relay of claim 8 wherein the parameter comprises at least one of ambient light, temperature, and detected motion.

10. The system of claim 8 wherein the controller is configured to turn ON and OFF a plurality of lighting modules according to a schedule.

11. A method of emulating a communication link between a controller and at least one sensor, the controller responsive to data supplied by said sensor, the method comprising:
   receiving at a data relay a radio frequency (RF) signal transmitted from a remote location and representing sensor data comprising at least one value measured by at least one sensor, wherein the at least one sensor is configured to send the at least one value on at least one conductor of a hard wired communication link of a controller using a protocol;
   retrieving at the data relay a data signal from said RF signal;
   determining at the data relay the at least one value from the data signal; and
   sending at the data relay the at least one value on the at least one conductor of the hard wired communication link of the controller using the protocol.

12. The method of claim 11 wherein the sensor data comprises at least one of rain events, temperature, solar radiation, wind speed, humidity, soil moisture, evapotranspiration, and flow.

13. The method of claim 11 wherein the controller comprises an irrigation control configured to turn ON and OFF a plurality of irrigation valves according to a watering schedule.

14. The method of claim 11 wherein the sensor data comprises at least one of ambient light, temperature, and detected motion.

15. The method of claim 11 wherein the controller is a lighting controller configured to turn ON and OFF a plurality of lighting modules according to a schedule.

16. A data relay comprising:
   a radio frequency (RF) receiver configured to receive an RF signal transmitted from a remote location and representing sensor data comprising at least one value measured by at least one sensor, wherein the at least one sensor is configured to modulate the at least one value on at least one conductor of a hard wired communication link of a controller using a protocol;
   a demodulator configured to retrieve a data signal from the RF signal;

a microcontroller configured to receive the data signal and determine the at least one value; and a modulator controlled by the microcontroller and configured to modulate the at least one value on the at least one conductor of the hard wired communication link of the controller using the protocol.

17. The data relay of claim 16 wherein the sensor data comprises at least one of rain events, temperature, solar radiation, wind speed, humidity, soil moisture, evapotranspiration, and flow.

18. The data relay of claim 16 wherein the sensor data comprises at least one of ambient light, temperature, and detected motion.

19. The data relay of claim 16 wherein the microcontroller is configured to drive the modulator to emulate physical and protocol properties of the hard-wired communication link.

20. The data relay of claim 16 wherein the data signal comprises a baseband data signal.

* * * * *